United States Patent
Zhou et al.

(10) Patent No.: US 11,448,599 B1
(45) Date of Patent: Sep. 20, 2022

(54) METHOD FOR TRAPPING MOLECULE WITH OPTICAL FIBER TWEEZERS BASED ON PHASE TRANSITION AND CRYSTALLIZATION AND METHOD FOR DETECTING RAMAN SPECTRUM OF PERSISTENT ORGANIC POLLUTANT

(71) Applicant: Dongguan University Of Technology, Guangdong (CN)

(72) Inventors: Fei Zhou, Dongguan (CN); Ye Liu, Dongguan (CN); Hongcheng Wang, Dongguan (CN); Yadong Wei, Dongguan (CN); Geng Zhang, Dongguan (CN); Shaoqiang Zhang, Dongguan (CN)

(73) Assignee: Dongguan University Of Technology, Guangdong (CN)

( * ) Notice: Subject to any disclaimer, the term of this patent is extended or adjusted under 35 U.S.C. 154(b) by 0 days.

(21) Appl. No.: 17/386,896

(22) Filed: Jul. 28, 2021

(30) Foreign Application Priority Data

Apr. 7, 2021 (CN) .......................... 202110371421.5

(51) Int. Cl.
*G01N 21/65* (2006.01)
*G01N 21/552* (2014.01)
*G01N 21/47* (2006.01)

(52) U.S. Cl.
CPC ......... *G01N 21/658* (2013.01); *G01N 21/474* (2013.01); *G01N 21/554* (2013.01);
(Continued)

(58) Field of Classification Search
CPC .................................................... G01N 21/658
See application file for complete search history.

(56) References Cited

U.S. PATENT DOCUMENTS 6,469,187 B1 * 10/2002 Craven ..................... C11B 3/06
554/195
6,770,488 B1 * 8/2004 Carron ................. G01N 21/658
356/301
(Continued)

OTHER PUBLICATIONS

Chen, Jiajie, et al. "Photochemically synthesized silver nanostructures on tapered fiber as plasmonic tweezers for surface enhanced Raman scattering applications." Vacuum 118 (2015): 171-176. (Year: 2015).*

*Primary Examiner* — Rufus L Phillips
(74) *Attorney, Agent, or Firm* — R. William Graham

(57) ABSTRACT

The present disclosure provides a method for trapping molecules with optical fiber tweezers based on phase transition and crystallization and a method for detecting a Raman spectrum of a persistent organic pollutant, belonging to the technical field of surface-enhanced Raman spectroscopy. Based on quite different solubilities of a substance to be detected in different solvents, dissolved phase small molecules to be detected are transformed into large size crystalline phase molecules through the physical process of phase transition and crystallization. Further, effective trapping of molecules to be detected that are not prone to bonding to noble metal nanoparticles in the vicinity of the noble metal nanoparticles can be achieved by combining the physical process of phase transition and crystallization with the physical trapping technique using optical fiber tweezers, so that the sensitivity of surface-enhanced Raman scattering (SERS) spectrum detection is significantly improved.

9 Claims, 4 Drawing Sheets

(52) U.S. Cl.
CPC ............... *G01N 2021/4742* (2013.01); *G01N 2201/06113* (2013.01)

(56) References Cited

U.S. PATENT DOCUMENTS

| | | | |
|---|---|---|---|
| 2004/0012778 A1* | 1/2004 | Li ............................. | G01J 3/44 356/301 |
| 2005/0142567 A1* | 6/2005 | Su ...................... | G01N 21/6458 435/6.11 |
| 2006/0054506 A1* | 3/2006 | Natan .................. | G01N 21/658 205/112 |
| 2008/0201085 A1* | 8/2008 | Pauli ................. | G01N 30/8675 702/25 |
| 2010/0166650 A1* | 7/2010 | Gambhir ............ | A61K 49/0065 424/1.11 |
| 2010/0182607 A1* | 7/2010 | Chau ................... | G01N 21/554 356/445 |
| 2014/0354979 A1* | 12/2014 | Li ......................... | G01N 21/41 356/128 |

\* cited by examiner

METHOD FOR TRAPPING MOLECULE WITH OPTICAL FIBER TWEEZERS BASED ON PHASE TRANSITION AND CRYSTALLIZATION AND METHOD FOR DETECTING RAMAN SPECTRUM OF PERSISTENT ORGANIC POLLUTANT

CROSS REFERENCE TO RELATED APPLICATION

This patent application claims the benefit and priority of Chinese Patent Application No. 202110371421.5, filed on Apr. 7, 2021, the disclosure of which is incorporated by reference herein in its entirety as part of the present application.

TECHNICAL FIELD

The present disclosure relates to the technical field of surface-enhanced Raman spectroscopy, and in particular, to a method for trapping molecules with optical fiber tweezers based on phase transition and crystallization and a method for detecting a Raman spectrum of a persistent organic pollutant.

BACKGROUND ART

Surface-enhanced Raman scattering (SERS), as a generally applicable Raman spectral enhancement technique, has attracted extensive attention in recent years. In SERS spectroscopy, Raman enhancement is achieved by means of localized surface plasmon resonance (LSPR) of noble metal nanoparticles. Specifically, when a visible light shines on the surface of noble metal nanoparticles, outer electrons of particles oscillate collectively, resulting in strong localized field enhancement in the vicinity of the particles. When a molecule to be detected is just located at the position of the strong localized field enhancement, the Raman signal thereof will be enhanced significantly. Hence, in addition to a SERS substrate having a high enhancement factor, the trapping of molecules to be detected on the surface of a noble metal nanostructure is also crucial to high sensitivity SERS spectrum detection.

Currently, the SERS detection on molecules to be detected (e.g., persistent organic pollutants (POPs)) that are not prone to bonding to noble metal nanoparticles (e.g., gold, silver) is low in sensitivity. Therefore, the trapping of molecules to be detected in the vicinity of nanoparticles is usually achieved by using a modifying molecule-based chemical trapping method. For example, a modifying molecule (e.g., silane coupling agent, cyclodextrin) is bonded to a noble metal nanostructure and a molecule to be detected at two ends, respectively, the distance between the molecule to be detected and the noble metal nanostructure is shortened. As a result, the sensitivity of the SERS spectrum detection of such molecules is improved to a certain extent. However, since modifying molecules usually have obvious Raman signals, such a modifying molecule-based chemical trapping method would have a great impact on the quality of the SERS spectra and would drastically reduce the signal-to-noise ratio of a spectrum especially in case of low sample concentrations. Thus, the improvement of the sensitivity of the SERS detection is restricted.

SUMMARY

An objective of the present disclosure is to provide a method for trapping molecules with optical fiber tweezers based on phase transition and crystallization and a method for detecting a Raman spectrum of a persistent organic pollutant. Molecules to be detected that are not prone to bonding to noble metal nanoparticles can be effectively trapped in the vicinity of the noble metal nanoparticles by combining the physical process of phase transition and crystallization with the physical trapping technique using optical fiber tweezers. Besides, no interference signal is introduced, and high signal-to-noise ratio and high sensitivity are achieved.

To achieve the objective of the present disclosure, the present disclosure provides the following technical solution.

The present disclosure provides a method for trapping molecules with optical fiber tweezers based on phase transition and crystallization, including the following steps:

dissolving a substance to be detected in a first solvent to obtain a solution of the substance to be detected, where the substance to be detected includes a persistent organic pollutant;

mixing the solution of the substance to be detected with a second solvent to form a mixed solution of a crystalline phase sample to be detected, where the first solvent and the second solvent are mutually soluble in each other and the solubility of the substance to be detected in the first solvent is greater than or equal to 100 times higher than that in the second solvent; and inserting a sensing tip of an evanescent wave fiber optic surface-enhanced Raman scattering (SERS) probe into the mixed solution of the crystalline phase sample to be detected and connecting a coupling tip of the evanescent wave fiber optic SERS probe to a Raman spectrometer to trap the crystalline phase sample to be detected by using optical fiber tweezers.

the evanescent wave fiber optic SERS probe includes an evanescent wave optical fiber structure and noble metal nanoparticles attached to the surface of the evanescent wave optical fiber structure.

Preferably, the persistent organic pollutant may include an organochlorine insecticide or polychlorinated biphenyl.

Preferably, the organochlorine insecticide may include dichlorodiphenyltrichloroethane; and the polychlorinated biphenyl may include 3,3',4,4'-tetrachlorobiphenyl, 2,4,4'-trichlorobiphenyl or 2,2,5,5-tetrachlorobiphenyl.

Preferably, the first solvent may include acetone or n-hexane.

Preferably, the organic solvent may include water or ethanol.

Preferably, a volume ratio of the first solvent to the second solvent may be 1:(5-9).

Preferably, the evanescent wave optical fiber structure may include a monoconical optical fiber, a biconical optical fiber or a combined conical optical fiber.

The present disclosure provides a method for detecting a Raman spectrum of a persistent organic pollutant, including the following steps:

trapping a persistent organic pollutant in a mixed solution of a crystalline phase sample to be detected by the method described above, collecting SERS signals of the sample to be detected by using a Raman spectrometer, and comparing measured Raman spectrum and standard Raman spectrum of the sample to be detected to determine the type of the sample to be detected.

Preferably, the SERS signals of the sample to be detected may be collected under conditions of a Raman excitation wavelength of 785 nm, power of 60 mW, and integration time of 2 seconds.

The present disclosure provides a method for trapping molecules with optical fiber tweezers based on phase transition and crystallization, including the following steps: dissolving a substance to be detected in a first solvent to obtain a solution of the substance to be detected, where the substance to be detected includes a persistent organic pollutant; mixing the solution of the substance to be detected with a second solvent to form a mixed solution of a crystalline phase sample to be detected, where the first solvent and the second solvent are mutually soluble in each other and the solubility of the substance to be detected in the first solvent is greater than or equal to 100 times higher than that in the second solvent; and inserting a sensing tip of an evanescent wave fiber optic surface-enhanced Raman scattering (SERS) probe into the mixed solution of the crystalline phase sample to be detected and connecting a coupling tip of the evanescent wave fiber optic SERS probe to a Raman spectrometer to trap the crystalline phase sample to be detected by using optical fiber tweezers, where the evanescent wave fiber optic SERS probe includes an evanescent wave optical fiber structure and noble metal nanoparticles attached to the surface of the evanescent wave optical fiber structure. According to the present disclosure, based on quite different solubilities of molecules to be detected in different solvents, dissolved phase small molecules to be detected are transformed into large size crystalline phase molecules, thereby facilitating effective trapping of the substance to be detected. Moreover, the evanescent wave fiber optic SERS probe (including an evanescent wave optical fiber and noble metal nanostructures attached to the surface of the evanescent wave optical fiber) is used as a substrate for trapping the molecules to be detected in the present disclosure. Under the action of exciting light for Raman spectra, a laser beam transmitted along the evanescent wave fiber optic SERS probe experiences light-heat-force multi-field coupled interaction with the molecules to be detected in the form of evanescent wave or radiation wave at the evanescent wave structure of the optical fiber (i.e., the conical surface of the optical fiber of the evanescent wave fiber optic SERS probe). Nonuniform surface temperature distribution will be induced on the surface of the crystalline phase substance to be detected under laser irradiation, thus creating directional motion to the surface of the evanescent wave optical fiber, i.e., forming optical fiber tweezers. With a large size, the crystalline phase molecules to be detected may exhibit apparent nonuniform surface temperature distribution under laser irradiation. Thus, simultaneous trapping of a large quantity of the crystalline phase molecules to be detected within a large range in the mixed solution can be achieved easily under the action of the optical fiber tweezers. Therefore, by using the optical fiber tweezers, the crystalline phase molecules to be detected in the mixed solution can be trapped in the vicinity of the noble metal nanoparticles of the evanescent wave fiber optic SERS probe (i.e., the trapping of the crystalline phase molecules to be detected is achieved), so that the evanescent wave fiber optic SERS probe experiences SERS interaction with the crystalline phase molecules to generate strong SERS signals that are coupled into the evanescent wave fiber optic SERS probe. Subsequently, high sensitivity detection of the SERS spectrum of the molecules to be detected is performed by using the Raman spectrometer.

In the present disclosure, the physical process of phase transition and crystallization is combined with the physical trapping technique using optical fiber tweezers. Based on quite different solubilities of molecules to be detected in different solvents, dissolved phase small molecules to be detected are transformed into large size crystalline phase molecules, thereby facilitating the trapping of the molecules on the surface of the evanescent wave fiber optic SERS probe by using the optical fiber tweezers. As a result, the problem of difficult direct trapping of dissolved phase small molecules by using optical fiber tweezers at present is solved. Moreover, effective trapping of molecules to be detected that are not prone to bonding to noble metal nanoparticles in the vicinity of the noble metal nanoparticles can be achieved, so that the sensitivity of SERS spectrum detection is significantly improved. Thus, a novel approach is provided for high sensitivity SERS spectrum detection of molecules to be detected that are not prone to directly bonding to noble metal nanoparticles.

In the present disclosure, the physical trapping method is used to replace the traditional modifying molecule-based chemical trapping method. Thus, the influence of Raman signals of modifying molecules on the SERS spectra of molecules to be detected can be effectively avoided, and the signal-to-noise ratio of SERS spectra and the detection sensitivity can be improved.

DETAILED DESCRIPTION OF THE EMBODIMENTS

Figure 1:
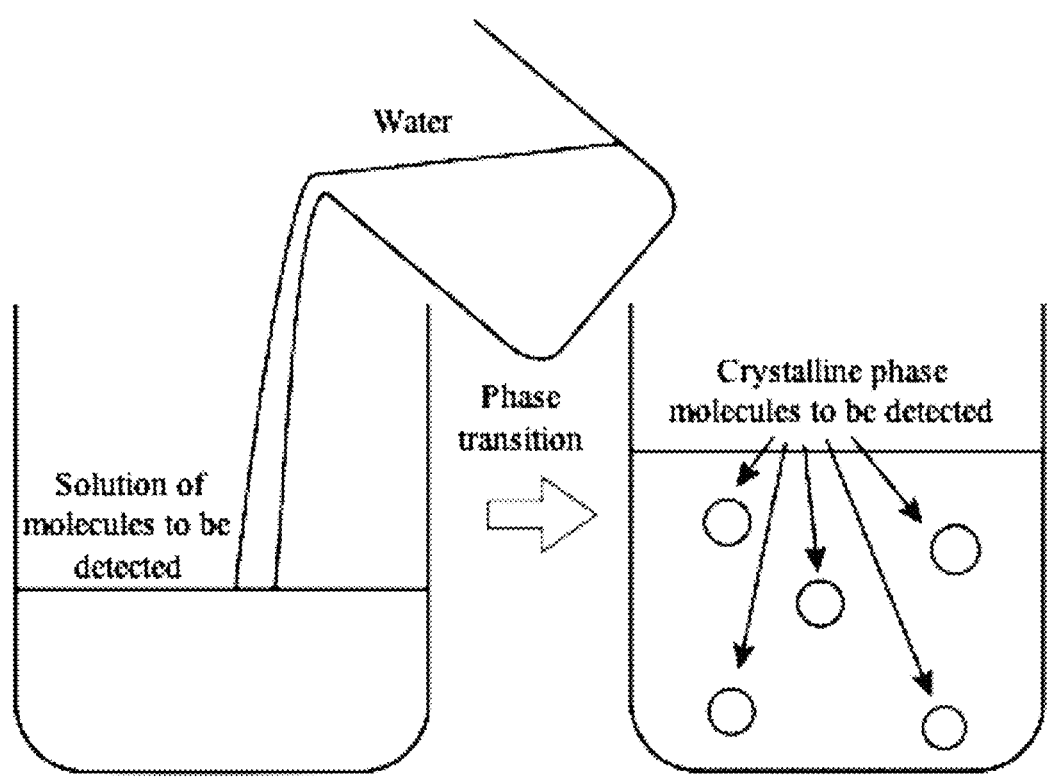
FIG. 1 is a schematic diagram showing the process of phase transition and crystallization of a substance to be detected according to an embodiment of the present disclosure.

The present disclosure provides a method for trapping molecules with optical fiber tweezers based on phase transition and crystallization, including the following steps:

A substance to be detected is dissolved in a first solvent to obtain a solution of the substance to be detected, where the substance to be detected includes a persistent organic pollutant.

The solution of the substance to be detected is mixed with a second solvent to form a mixed solution of a crystalline phase sample to be detected, where the first solvent and the second solvent are mutually soluble in each other and the solubility of the substance to be detected in the first solvent is greater than or equal to 100 times higher than that in the second solvent.

A sensing tip of an evanescent wave fiber optic surface-enhanced Raman scattering (SERS) probe is insert into the mixed solution of the crystalline phase sample to be detected, and a coupling tip of the evanescent wave fiber optic SERS probe is connected to a Raman spectrometer to trap the crystalline phase sample to be detected by using optical fiber tweezers.

The evanescent wave fiber optic SERS probe includes an evanescent wave optical fiber structure and noble metal nanoparticles attached to the surface of the evanescent wave optical fiber structure.

In the present disclosure, reagents or components needed are all commercially available products well known to those skilled in the art, unless otherwise specified.

According to the present disclosure, the substance to be detected is dissolved in the first solvent to obtain the solution of the substance to be detected. In the present disclosure, the substance to be detected includes a persistent organic pollutant. The persistent organic pollutant includes an organochlorine insecticide or polychlorinated biphenyl. The organochlorine insecticide preferably includes DDT. The polychlorinated biphenyl (PCBs) preferably includes 3,3',4,4'-tetrachlorobiphenyl, 2,4,4'-trichlorobiphenyl or 2,2,5,5'-tetrachlorobiphenyl.

In the present disclosure, the first solvent preferably includes acetone or n-hexane. There is not any limitation on the concentration of the solution of the substance to be detected in the present disclosure, and the concentration can be adjusted in accordance with actual substances to be detected. In the embodiment of the present disclosure, the concentration of the solution of the substance to be detected is particularly $5*10^{-6}$ mol/L.

According to the present disclosure, after the solution of the substance to be detected is obtained, the substance to be detected is mixed with the second solvent to form the mixed solution of the crystalline phase sample to be detected. In the present disclosure, the second solvent preferably includes water or ethanol. The volume ratio of the first solvent to the second solvent is preferably 1:(5 to 9). In the embodiment of the present disclosure, the volume ratio of the first solvent to the second solvent is particularly 1:9. In the present disclosure, the first solvent and the second solvent are mutually soluble in each other and the solubility of the substance to be detected in the first solvent is greater than or equal to 100 times higher than that in the second solvent.

Since the solubility of the substance to be detected in the second solvent is lower than that in the first solvent, the solubility of the substance to be detected in the mixed solution of the solution of the substance to be detected and the second solvent is reduced, so that the substance to be detected is transformed from the original dissolved phase to the crystalline phase, obtaining the mixed solution of the crystalline phase sample to be detected. Taking, for example, water as the second solvent, the process of phase transition and crystallization of the substance to be detected is as shown in FIG. 1. After water is mixed with the solution of the substance to be detected, gradual phase transition of the substance to be detected is caused due to lower solubility thereof in water, resulting in the formation of the crystalline phase substance to be detected.

According to the present disclosure, after the mixed solution of the crystalline phase sample to be detected is obtained, the sensing tip of the evanescent wave fiber optic SERS probe is inserted into the mixed solution of the crystalline phase sample to be detected and the coupling tip of the evanescent wave fiber optic SERS probe is connected to the Raman spectrometer to trap the crystalline phase sample to be detected by using optical fiber tweezers.

In the present disclosure, the evanescent wave fiber optic SERS probe includes an evanescent wave optical fiber structure and noble metal nanoparticles attached to the surface of the evanescent wave optical fiber structure. In the present disclosure, the evanescent wave optical fiber structure includes a monoconical optical fiber, a biconical optical fiber or a combined conical optical fiber. There is not any limitation the source of the evanescent wave optical fiber structure in the present disclosure, and this structure can be obtained according to the common method in the art. In the present disclosure, the evanescent wave fiber optic SERS probe is prepared preferably by a laser induced method, an electrostatic adsorption method or a physical vapor deposition method. The evanescent wave fiber optic SERS probe used in the present disclosure is preferably prepared according to a method described in Chinese patent No. CN109520990A entitled "METHOD OF PREPARING CONICAL FIBER OPTIC SERS PROBE BY LASER INDUCED ONE-STEP LIFTING METHOD". Specifically, a laser device, a conical optical fiber, a noble metal nanoparticle sol and a one-dimensional precision displacement platform are used. The conical optical fiber has a flush end and a tapered end. The flush end of the conical optical fiber is fused with an output tail fiber of the laser device, while the tapered end is inserted into the prepared noble metal nanoparticle sol. The central part of the conical optical fiber is fixed to a moving end of the one-dimensional precision displacement platform. The laser device is switched on, and under inducing laser irradiation, the tapered end of the optical fiber is slowly lifted out of the noble metal nanoparticle sol by using the one-dimensional precision displacement platform until the sharp point of the tapered end is located at the interface with the top surface of the noble metal nanoparticle sol. With high laser power density at the sharp point of the optical fiber in the vicinity of the interface of the noble metal nanoparticle sol, nanoparticles absorb laser energy and convert the energy into heat, leading to rapid rise of local temperature at the sharp point of the optical fiber. Thus, the Brownian motion of the nanoparticles is accelerated, so that the odds of collision of the nanoparticles with the conical surface of the optical fiber are increased. With slowly upward lifting of the tapered end of the optical fiber, the nanoparticle sol is adsorbed onto the conical surface of the optical fiber under the action of surface tension. Besides, under inducing laser irradiation, the solvent is caused to volatilize rapidly, while the nanoparticles are aggregated on the conical surface, forming a conical fiber optic SERS probe.

There is not any limitation on the Raman spectrometer in the present disclosure, and any common Raman spectrometer in the art can be used. In the embodiment of the present disclosure, the Raman spectrometer is a portable Raman spectrometer. In the present disclosure, the laser device used for the Raman spectrometer preferably serves as a light source for optical fiber tweezers and a Raman exciting light source.

There is not any limitation on the connection of the coupling tip of the evanescent wave fiber optic SERS probe and the Raman spectrometer in the present disclosure, and the connection can be conducted according to a common process in the art.

According to the present disclosure, after the coupling tip of the evanescent wave fiber optic SERS probe is connected to the Raman spectrometer, the laser device of the Raman spectrometer is preferably switched on, so that the trapping of the crystalline phase sample to be detected on the surface of the optical fiber is achieved under the evanescent wave light field of the optical fiber.

Figure 2:
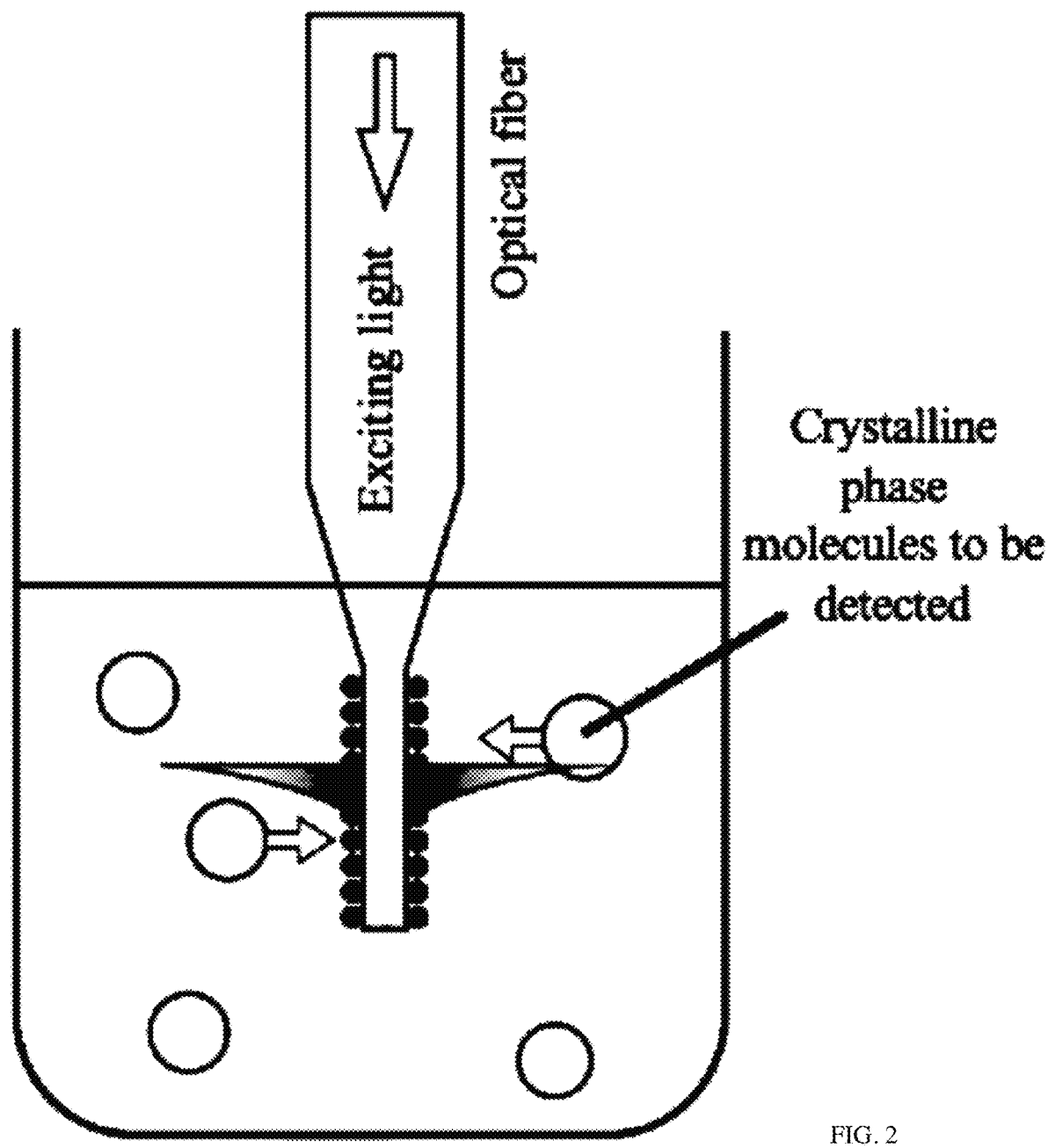
FIG. 2 is a schematic diagram showing the trapping of a crystalline phase substance to be detected by using optical fiber tweezers according to an embodiment of the present disclosure.

Under the action of exciting light for Raman spectra, a laser beam transmitted along the evanescent wave fiber optic SERS probe experiences light-heat-force multi-field coupled interaction with the molecules to be detected in the form of evanescent wave or radiation wave at the evanescent wave structure of the optical fiber (i.e., the conical surface of the optical fiber of the evanescent wave fiber optic SERS probe). Nonuniform surface temperature distribution will be induced on the crystal surface of the substance to be detected under laser irradiation (a temperature gradient is formed), thus pushing the crystal of the substance to be detected to move toward the surface with high light intensity of the optical fiber and then creating directional motion to the surface of the evanescent wave optical fiber, i.e., forming photophoretic optical fiber tweezers. The dissolved phase molecules to be detected are tiny (at the sub-nanometer scale, difficult to trap) and exhibit unapparent nonuniform surface temperature distribution, and thus are difficult to trap by using optical fiber tweezers. The crystalline phase substance to be detected has a large size (at the micron scale) and exhibits apparent nonuniform surface temperature distribution under laser irradiation. Thus, simultaneous trapping of a large quantity of the crystalline phase substance to be detected in the vicinity of the evanescent wave fiber optic SERS probe within a large range in the mixed solution can be achieved easily under the action of the optical fiber tweezers (as shown in FIG. 2). Therefore, by using the optical fiber tweezers, the crystalline phase substance to be detected in the mixed solution can be trapped in the vicinity of the noble metal nanoparticles of the evanescent wave fiber optic SERS probe, i.e., the trapping of the crystalline phase substance to be detected is achieved.

The present disclosure provides a method for detecting a Raman spectrum of a persistent organic pollutant, including the following steps:

A persistent organic pollutant in a mixed solution of a crystalline phase sample to be detected was trapped by the method described above; SERS signals of the sample to be detected are collected by using a Raman spectrometer; and measured Raman spectrum and standard Raman spectrum of the sample to be detected are compared to determine the type of the sample to be detected. In the present disclosure, the SERS signals of the sample to be detected are collected preferably under conditions of a Raman excitation wavelength of 785 nm, power of 60 mW, and integration time of 2 seconds. In the present disclosure, the standard Raman spectrum of the sample to be detected is preferably from a spectrum library. There is no any limitation on the comparison in the present disclosure, and the comparison can be conducted according to a common process in the art.

In the present disclosure, according to the technical solutions described above, by using the optical fiber tweezers, the crystalline phase substance to be detected (a persistent organic pollutant) in the mixed solution is trapped in the vicinity of the noble metal nanoparticles of the evanescent wave fiber optic SERS probe (i.e., the trapping of the crystalline phase substance to be detected is achieved), so that the evanescent wave fiber optic SERS probe experiences SERS interaction with the crystalline phase substance to generate strong SERS signals that are coupled into the evanescent wave fiber optic SERS probe. Subsequently, high sensitivity detection of the SERS spectrum of the substance to be detected is performed by using the Raman spectrometer.

The technical solutions in the present disclosure will be clearly and completely described below with reference to examples of the present disclosure. It is clear that the described examples are only a part of, not all of, the examples of the present disclosure. All other examples obtained by a person of ordinary skill in the art based on the examples of the present disclosure without creative efforts shall fall within the protection scope of the present disclosure.

Example 1

Molecules to be detected, organochlorine insecticide dichlorodiphenyltrichloroethane (DDT, poorly soluble in water), were dissolved in acetone to obtain a solution of DDT in acetone at the concentration of $5*10^{-6}$ mol/L. A mixed solution of DDT in acetone and water at the concentration of $5*10^{-7}$ mol/L was prepared by well mixing 100 μl of solution of DDT in acetone at the concentration of $5*10^{-6}$ mol/L with 900 μl of deionized water. The change of the solvent components in the mixed solution led to dramatic drop of the solubility of DDT in the mixed solution. Therefore, the mixed solution rapidly became ivory-white and cloudy, and crystalline phase DDT was formed.

The sensing tip of an evanescent wave fiber optic SERS probe was inserted into the mixed solution of DDT in acetone and water at the concentration of $5*10^{-7}$ mol/L (with phased transition), and the coupling tip of the evanescent wave fiber optic SERS probe was connected to a portable Raman spectrometer. A laser device of the Raman spectrometer was then switched on to trap the crystalline phase DDT molecules, and SERS signals were observed.

Comparative Example 1

The sensing tip of an evanescent wave fiber optic SERS probe prepared in the same batch with that in Example 1 was inserted into the solution of DDT in acetone at the concentration of $5*10^{-6}$ mol/L (without phase transition) prepared in Example 1, and the coupling tip of the evanescent wave fiber optic SERS probe was connected to the portable Raman spectrometer. The laser device of the Raman spectrometer was then switched on, and SERS signals were observed.

The comparison made between the SERS spectrum (the corresponding curve with phase transition in FIG. 3) obtained in Example 1 and the standard Raman spectrum of DDT showed that the generated SERS signals were DDT signals. Thus, effective trapping and Raman spectrum detection of DDT were achieved.

Figure 3:
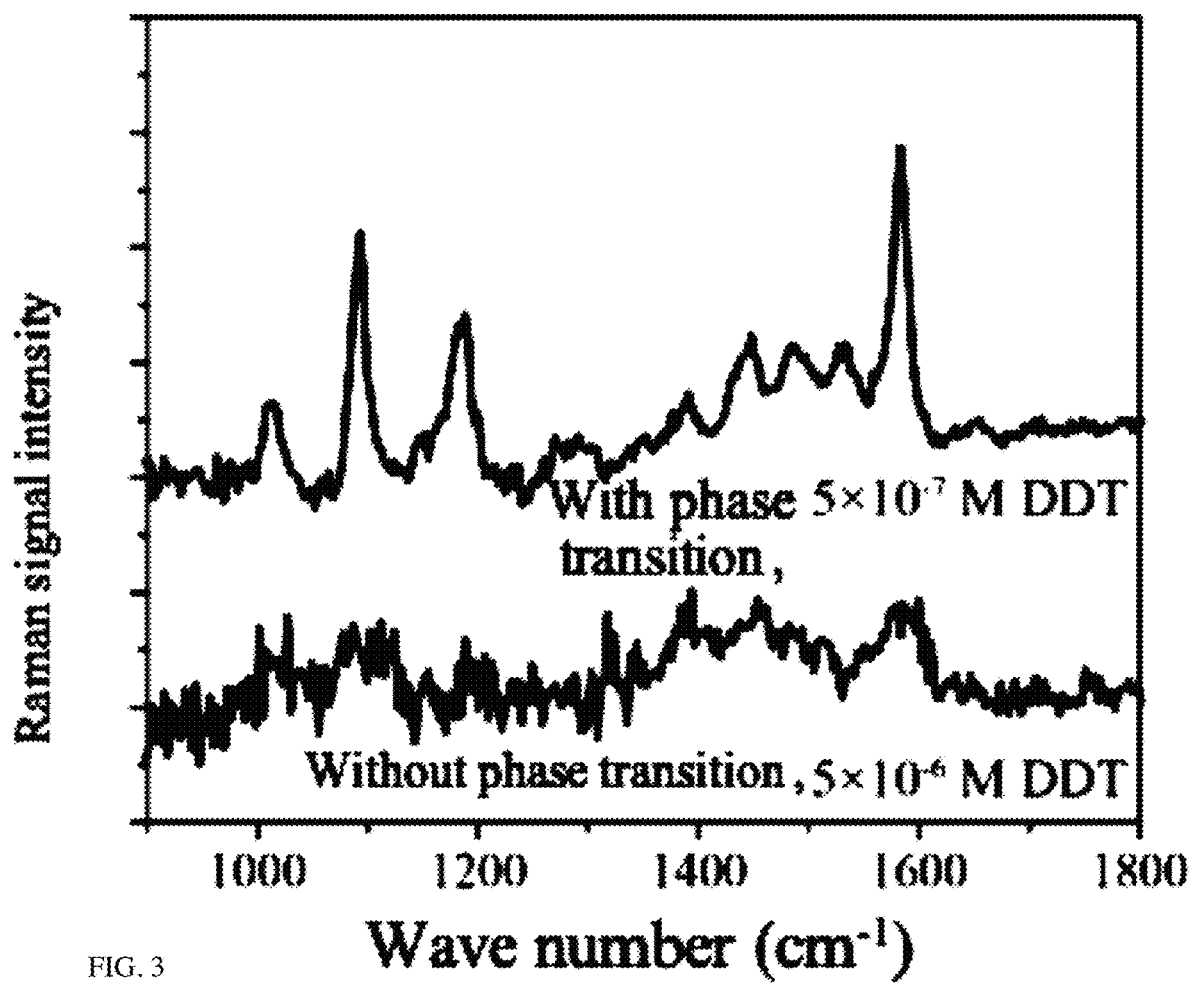
FIG. 3 is a diagram showing comparison between SERS spectra of dichlorodiphenyltrichloroethane (DDT) to be detected in Comparative Example 1 and Example 1 of the present disclosure.

FIG. 3 is a diagram showing comparison between SERS spectra (Raman exciting light wavelength of 785 nm, power of 60 mW, and integration time of 2 seconds) of DDT molecules in Comparative Example 1 and Example 1. As shown in FIG. 3, compared with the SERS spectrum of the solution of DDT at high concentration without phase transition (Comparative Example 1), the phase transition and crystallization process of the DDT molecules induced a significant increase in the intensity of the SERS signals in Example 1, indicating that effective trapping of the molecules to be detected (the molecules to be detected that were not prone to bonding to noble metal nanoparticles) on the surface of the noble metal nanoparticles could be achieved by combining the phase transition and crystallization process and trapping using optical fiber tweezers according to the present disclosure.

As can be seen from the above Example 1 and Comparative Example 1, when exciting light for Raman spectra was transmitted in the evanescent wave fiber optic SERS probe, the exiting light experienced light-heat-force multi-field coupled interaction with the molecules to be detected in the form of evanescent wave or radiation wave at the conical surface of the optical fiber. In other words, nonuniform surface temperature distribution would be induced on the surface of particles under laser irradiation, thus creating directional motion to the surface of the evanescent wave optical fiber, i.e., forming photophoretic optical fiber tweezers. Moreover, the dissolved phase DDT molecules were tiny and exhibited unapparent nonuniform surface temperature distribution, and thus were difficult to trap by using optical fiber tweezers. The crystalline phase DDT had a large size and exhibited apparent nonuniform surface temperature distribution under laser irradiation. Thus, simultaneous trapping of a large quantity of the crystalline phase DDT molecules within a large range could be achieved easily under the action of the optical fiber tweezers, and SERS signals were enhanced significantly.

Example 2

100 g of soil polluted by PCBs was soaked into 100 mL of acetone solution to extract PCBs in the soil, and the supernatant obtained by centrifuging was a solution of PCBs in acetone.

100 µl of the solution of PCBs in acetone was well mixed with 900 µl of deionized water to obtain a mixed solution of PCBs in acetone and water, with crystalline phase PCBs formed.

The sensing tip of an evanescent wave fiber optic SERS probe was inserted into the mixed solution of PCBs in acetone and water, and the coupling tip of the probe was connected to a portable Raman spectrometer. A laser device of the Raman spectrometer was then switched on to trap molecules, and SERS signals were observed.

Figure 4:
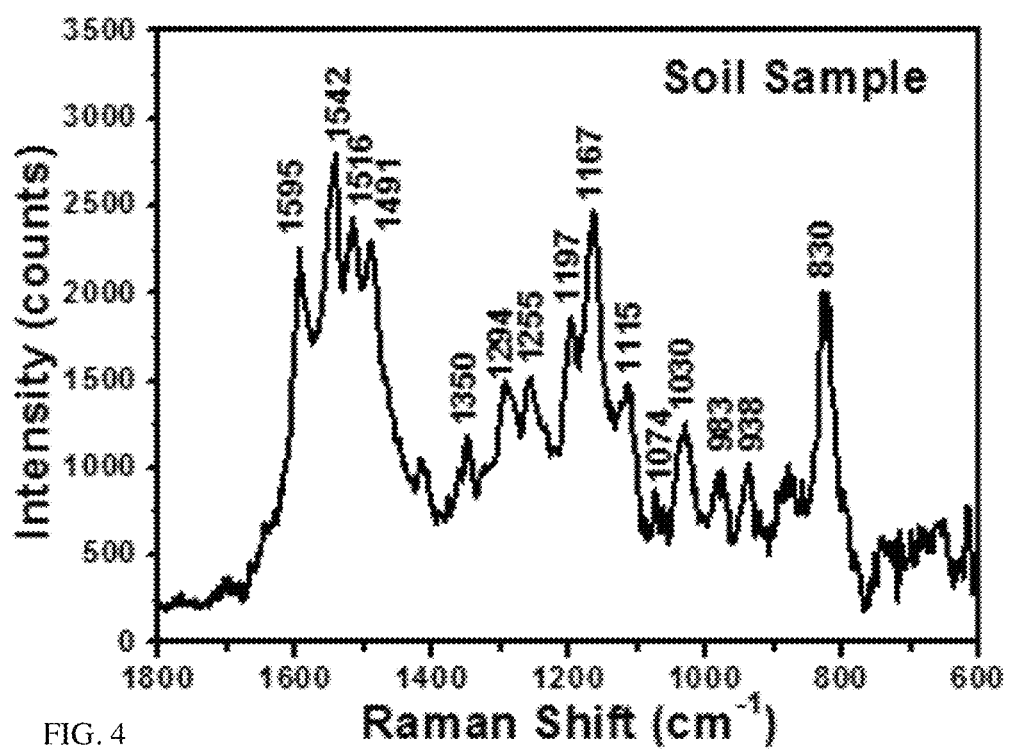
FIG. 4 is a diagram showing a SERS spectrum of a soil sample polluted by polychlorinated biphenyls (PCBs) tested in Example 2 of the present disclosure.

FIG. 4 is a diagram showing the SERS spectrum (Raman exciting light wavelength of 785 nm, power of 60 mW, and integration time of 2 seconds) of the soil sample measured in Example 2. In combination with a spectral peak comparison method, it was shown that the soil sample contained at least PCB77 (3,3',4,4'-tetrachlorobiphenyl, corresponding to Raman peaks 1167 $cm^{-1}$, 1197 $cm^{-1}$, 1245 $cm^{-1}$), PCB28 (2,4,4'-trichlorobiphenyl, corresponding to Raman peaks 1350 $cm^{-1}$, 1490 $cm^{-1}$), and PCB52 (2,2,5,5-tetrachlorobiphenyl, corresponding to Raman peaks 830 $cm^{-1}$, 1074 $cm^{-1}$). The foregoing are merely descriptions of preferred embodiments of the present disclosure.

It should be noted that a person of ordinary skill in the art can make several improvements and modifications without departing from the principle of the present disclosure, and such improvements and modifications should be deemed as falling within the protection scope of the present disclosure.

What is claimed is:

1. A method for trapping molecules with optical fiber tweezers based on phase transition and crystallization, comprising the following steps:
dissolving a substance to be detected in a first solvent to obtain a solution of the substance to be detected, where the substance to be detected comprises a persistent organic pollutant;
mixing the solution of the substance to be detected with a second solvent to form a mixed solution of a crystalline phase sample to be detected, wherein the first solvent and the second solvent are mutually soluble in each other and the solubility of the substance to be detected in the first solvent is greater than or equal to 100 times higher than that in the second solvent;
inserting a sensing tip of an evanescent wave fiber optic surface-enhanced Raman scattering (SERS) probe into the mixed solution of the crystalline phase sample to be detected and connecting a coupling tip of the evanescent wave fiber optic SERS probe with a Raman spectrometer, and trapping the crystalline phase sample to be detected by using optical fiber tweezers;
wherein the evanescent wave fiber optic SERS probe comprises an evanescent wave optical fiber structure and noble metal nanoparticles attached to the surface of the evanescent wave optical fiber structure;
wherein the first solvent comprises acetone, and the second solvent comprises water; and
wherein a volume ratio of the first solvent to the second solvent is between about 1:5 and 1:9.

2. The method according to claim 1, wherein the persistent organic pollutant comprises one of an organochlorine insecticide and a polychlorinated biphenyl.

3. The method according to claim 2, wherein the organochlorine insecticide comprises dichlorodiphenyltrichloroethane; and the polychlorinated biphenyl comprises 3,3',4,4'-tetrachlorobiphenyl, 2,4,4'-trichlorobiphenyl or 2,2',5,5'-tetrachlorobiphenyl.

4. The method according to claim 1, wherein the evanescent wave optical fiber structure comprises one of a monoconical optical fiber, a biconical optical fiber and a combined conical optical fiber.

5. A method for detecting a Raman spectrum of a persistent organic pollutant, comprising the following steps:
trapping a persistent organic pollutant in a mixed solution of a crystalline phase sample to be detected by the method according to claim 1, collecting SERS signals of the sample to be detected by using a Raman spectrometer, and comparing measured Raman spectrum and standard Raman spectrum of the sample to be detected to determine the type of the sample to be detected.

6. The method according to claim 5, wherein the persistent organic pollutant comprises one of an organochlorine insecticide and polychlorinated biphenyl.

7. The method according to claim 6, wherein the organochlorine insecticide comprises dichlorodiphenyltrichloroethane; and the polychlorinated biphenyl comprises 3,3',4,4'-tetrachlorobiphenyl, 2,4,4'-trichlorobiphenyl or 2,2',5,5'-tetrachlorobiphenyl.

8. The method according to claim 5, wherein the evanescent wave optical fiber structure comprises one of a monoconical optical fiber, a biconical optical fiber and a combined conical optical fiber.

9. The method according to claim 5, wherein the SERS signals of the sample to be detected are collected under conditions of a Raman excitation wavelength of 785 nm, power of 60 mW, and integration time of 2 seconds.

* * * * *